(12) United States Patent
Rund

(10) Patent No.: US 8,074,768 B2
(45) Date of Patent: Dec. 13, 2011

(54) POWERED OPERATOR ACCESS SYSTEM

(75) Inventor: Anthony M. Rund, Decatur, IL (US)

(73) Assignee: Caterpillar Inc., Peoria, IL (US)

( * ) Notice: Subject to any disclaimer, the term of this patent is extended or adjusted under 35 U.S.C. 154(b) by 499 days.

(21) Appl. No.: 12/267,295

(22) Filed: Nov. 7, 2008

(65) Prior Publication Data
US 2010/0116590 A1 May 13, 2010

(51) Int. Cl.
*E06C 9/00* (2006.01)
(52) U.S. Cl. .............. 182/86; 182/97; 182/127; 182/93; 182/207; 182/208
(58) Field of Classification Search .................. 182/127, 182/85, 86, 88, 97, 93, 207, 208, 96, 64.1, 182/66.1, 66.2, 68.1; 280/166
See application file for complete search history.

(56) References Cited

U.S. PATENT DOCUMENTS

| | | | |
|---|---|---|---|
| 2,446,434 A | 8/1948 | Rechain | |
| 2,990,148 A | 6/1961 | James | |
| 3,386,531 A * | 6/1968 | Sallein | 182/207 |
| 3,464,517 A | 9/1969 | Akermanis | |
| 3,554,320 A * | 1/1971 | Eggert, Jr. | 182/49 |
| 3,656,578 A | 4/1972 | Hemken | |
| 3,869,022 A * | 3/1975 | Wallk | 182/96 |
| 3,871,479 A | 3/1975 | Pelto | |
| 3,997,026 A * | 12/1976 | Riehlmann | 182/96 |
| 4,079,815 A * | 3/1978 | Cormier | 182/195 |
| 4,153,138 A * | 5/1979 | Walberg | 182/98 |
| 4,924,970 A * | 5/1990 | Seals et al. | 182/91 |
| 5,060,427 A * | 10/1991 | Bernabe, Jr. | 52/118 |
| 5,205,603 A * | 4/1993 | Burdette, Jr. | 296/62 |
| 5,538,100 A * | 7/1996 | Hedley | 182/97 |
| 5,645,140 A * | 7/1997 | Mouneimneh | 182/195 |
| 5,970,905 A * | 10/1999 | Jaramillo, Sr. | 114/362 |
| 6,021,733 A | 2/2000 | Jaramillo, Sr. | |
| 6,068,277 A * | 5/2000 | Magnussen | 280/166 |
| 6,347,686 B1 * | 2/2002 | Hedley et al. | 182/86 |
| 6,948,588 B1 * | 9/2005 | Chustak | 182/97 |
| 6,994,184 B2 * | 2/2006 | Latimer et al. | 182/77 |
| 7,448,637 B2 * | 11/2008 | Parker | 280/166 |
| 2001/0030081 A1 * | 10/2001 | Morimoto et al. | 182/85 |
| 2003/0075384 A1 * | 4/2003 | Pickering | 182/116 |
| 2006/0011416 A1 * | 1/2006 | Gonzalez y Gil et al. | 182/127 |
| 2009/0038885 A1 * | 2/2009 | Ellement | 182/97 |
| 2009/0255758 A1 * | 10/2009 | Farley et al. | 182/88 |
| 2010/0012433 A1 * | 1/2010 | Ross et al. | 182/211 |

* cited by examiner

*Primary Examiner* — Katherine Mitchell
*Assistant Examiner* — Johnnie A Shablack
(74) *Attorney, Agent, or Firm* — Leydig, Voit & Mayer

(57) ABSTRACT

An access ladder configurable from an extended position for providing access to a structure and a stowed position. The access ladder comprises an elongated first member having a first step extending laterally therefrom. An elongated second member is associated with the first member and configured for translational movement relative thereto and has a second step extending laterally therefrom. A link extends between the second member and the structure such that rotation of the first member moves the second member translationally relative to the first member, thereby moving said at least one second step towards said at least one first step.

16 Claims, 6 Drawing Sheets

US 8,074,768 B2

POWERED OPERATOR ACCESS SYSTEM

TECHNICAL FIELD

This patent disclosure relates generally to access systems and, more particularly to systems for accessing operator stations of machines.

BACKGROUND

Many machines have operator controls located a distance from the ground. For example, large machines, such as large construction machines and large mining machines, often include cabs containing operator controls that are located atop the machines several feet from the ground. In order to access the controls, an operator needs the ability to ascend the distance from the ground to the cab. Many machines include access systems to aid the operator in accessing the controls of the machine. For instance, many machines include ladders, ramps, stair steps, and the like.

In many instances, machines must traverse rough terrain during their operation. For instance, wheel tractor scrapers, trucks, excavators, loaders, and other machines often pass over rough, ungroomed or unpaved ground of a construction or mining site. As a result, a large distance, often several feet, between the ground and the machine is desirable to allow the machine to pass over the terrain without hindrance or damage. In addition, large machines must pass vegetation, structures, and other machines while traversing a work site. Therefore, it is desirable that any access system provide adequate clearance to the ground and not project outwardly when the machine is in use, so as to avoid unintended contact with external objects.

SUMMARY

The disclosure describes, in one aspect, a ladder for access to a structure and egress therefrom, the ladder configurable from a first extended position for providing access to the structure and a second stowage position for storing the ladder when not in use. The ladder comprises an elongate upper member rotatably connected at an upper end to the structure at a connector and at least one upper step extending laterally from the upper member. An elongate lower member is attached to the upper member and configured for translational movement relative to the upper member. At least one lower step extends laterally from the lower member. The ladder includes a link extending between the lower member and the structure such that upward rotation of the upper member from the extended position to the stowage position causes the lower member to move translationally relative to the upper member, thereby moving said at least one upper step towards said at least one lower step.

DETAILED DESCRIPTION

This disclosure relates to powered access systems providing ingress and egress to operator stations of machines.

In the following description, various embodiments of the present disclosure will be described. For purposes of explanation, specific configurations and details are set forth in order to provide a thorough understanding of the embodiments. However, it will also be apparent to one skilled in the art that the present disclosure may be practiced without the specific details. Furthermore, well-known features may be omitted or simplified in order to focus on the embodiment being described.

Figure 1:
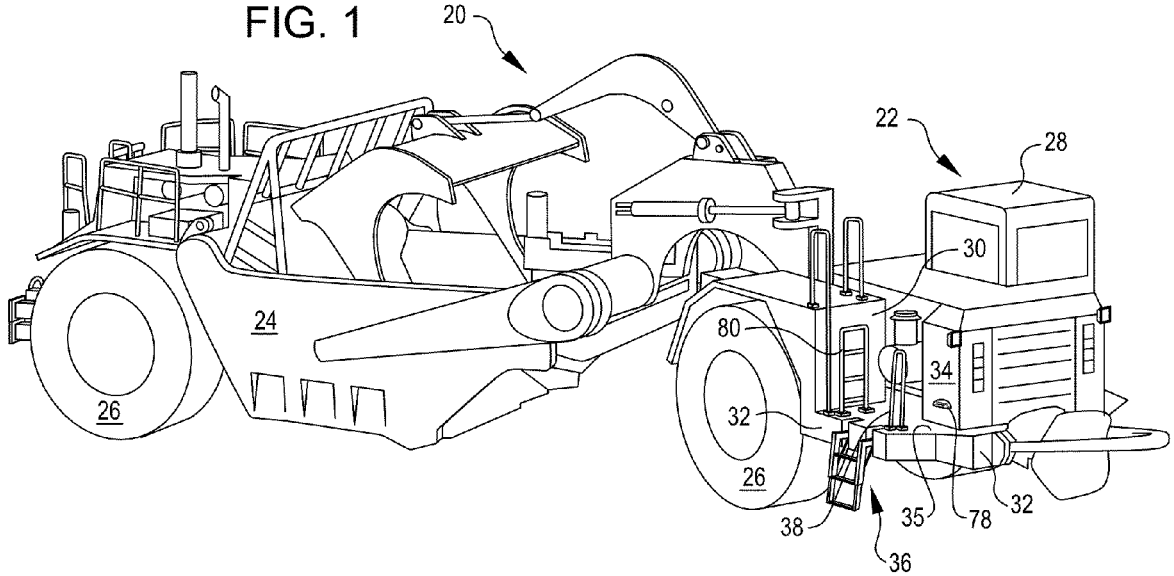
FIG. 1 is a side perspective view of a machine in accordance with an embodiment.

Referring now to the drawings, in which like reference numerals represent like parts throughout the several views, FIG. 1 shows a machine 20 in accordance with an embodiment. As shown in the drawings, the machine 20 can be a wheel tractor scraper, which is a machine that scraps dirt, clay, or other material from the ground in order to bring the ground to a desired grade, such as for a road. The machine 20 can be another type of machine, such as an articulated or other truck, a backhoe loader, a cold planer, compactor, feller buncher, forest machine, a forwarder, harvester, excavator, loader, knuckle boom loader, material handler, loader grader, multi-terrain loader, off-highway tractor, off-highway truck, a paving machine, a pipe layer, a road reclaimer, a scraper, a skid-steel loader, a skidder, a telehandler, track loader, track-type tractor, wheeled dozer, wheeled excavator, wheeled loader, or an underground machine, or any other type of machine. The machine 20 can be mobile, but it can also be stationary without the ability to move from one location to another.

In the embodiment shown in the drawings, the machine 20 includes a cab portion 22 (also referred to as a tractor portion) and a bed portion 24 (also referred to a hopper, scraper, or bowl portion, the hopper or bowl referring to a receptacle for material scraped into the bed portion 24), both of which are supported by a plurality of wheels 26. The cab portion 22 in an embodiment is configured for operating the machine 20. In an embodiment, the cab portion 22 includes a cab 28 housing operator controls of the machine 20. The cab 28 can sit in front of one of a pair of opposing fenders 30, each fender 30 extending over a wheel 26 on opposing sides of the cab portion 22. A bumper 32 extends from a front side of each fender 30 around a hood 34 for housing an engine of the machine 20. In an embodiment, the bumper 32 projects outwardly to form an upper surface of the bumper 32 shared with an upper surface of a ledge 35 extending laterally from a side of the hood 34 in front of the fender 30. An access system 36 for providing access to and egress from the cab 28 by use of a ladder, as described in more detail below, is connected to the ledge 35, although the access system 36 can be located at any suitable portion of the machine 20 such as in front of the fender 30 closest to the cab 28. Access systems such as the access system 36 shown, can be located in multiple locations of the machine 20. A handrail 38 projecting upwardly from the ledge 35 or other suitable location can be located in close proximity to the access system 36 to provide leverage to an operator utilizing the access system 36 by allowing the operator to grip the handrail 38 for leverage.

Figure 2:
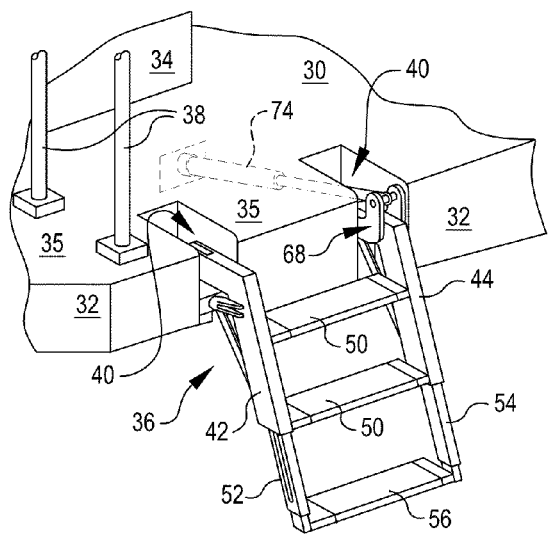
FIG. 2 is a side perspective view of an access system of the machine of FIG. 1 with the access system in an extended position.

As shown in FIG. 2, the ledge 35 includes two recesses 40 spaced one from the other. As shown in the drawing, the access system 36 includes a left first or upper member 42 and a right first or upper member 44, each rotatably connected to the machine 20 at one of the recesses 40. In an embodiment, the left upper member 42 is an elongate bar of metal or other suitable material extending to form an "L" shape, the shorter leg of the "L" extending towards the machine 20 at an angle, such as approximately ninety degrees, to the longer leg of the "L." The right upper member 44 is similarly configured to the left upper member 42 and extends a distance from and parallel to the left upper member 42. As shown in FIG. 2, the access system 36 is in an extended configuration whereby the access system 36 is configured as a ladder, with both the left upper member 42 and right upper member 44 extending downward and away from the ledge 35. From this position, the access system 36 can be used for accessing the cab 28, as described more fully below.

Figure 3:
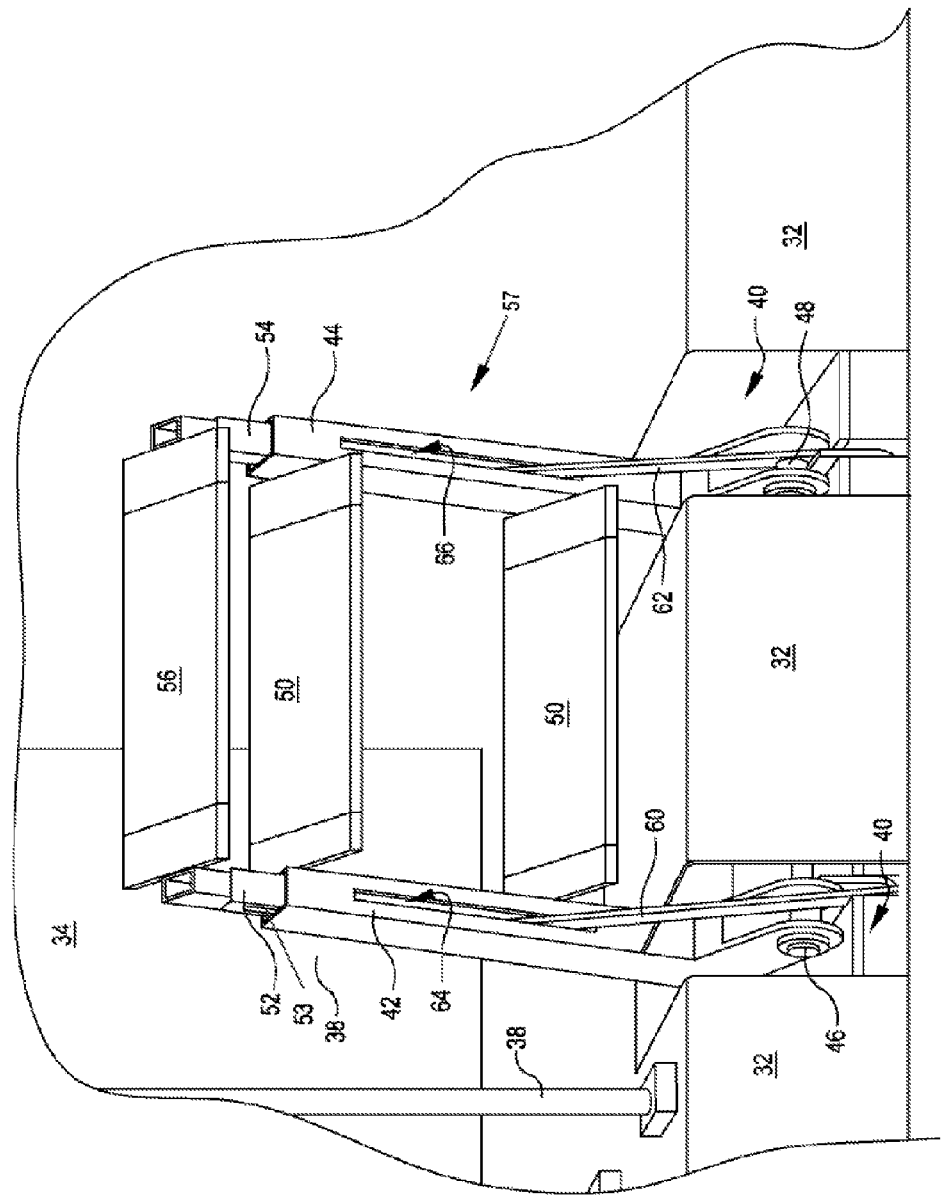
FIG. 3 is side a perspective view of the access system of FIG. 2.

FIG. 3 shows the access system 36 in a stowage configuration whereby the left upper member 42 and right upper member 44 have been rotated upwardly about a left hinge 46 or other connector located in one of the recesses 40 and right hinge 48 or other connector located in the other recess 40, respectively, so that the left upper member 42 and right upper member 44 extend upwardly from the left hinge 46 and right hinge 48 respectively.

Figure 4:
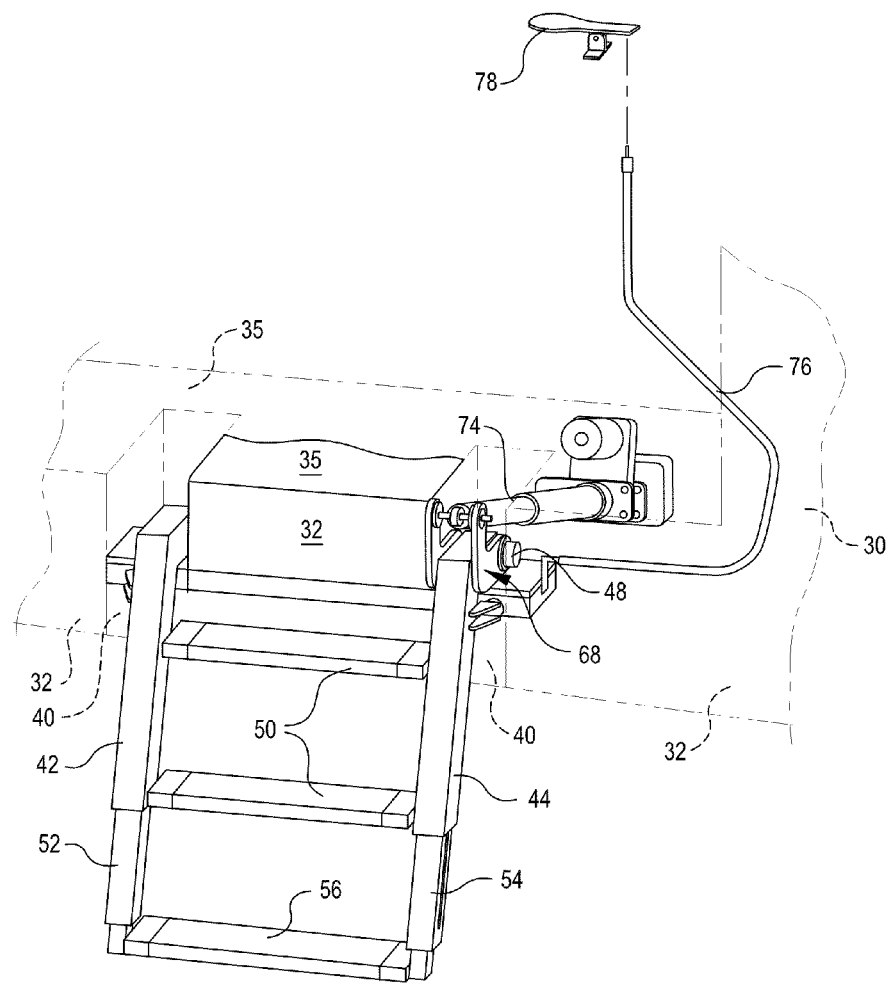
FIG. 4 is a side perspective view of the access system of FIG. 2, shown in greater detail.

FIG. 4 shows the access system 36 in greater detail. In an embodiment, the left upper member 42 and right upper member 44 extend parallel to one another with a plurality of steps 50 extending parallel and horizontally between them, thereby collectively forming an upper ladder portion. While the drawings show two steps 50 extending between the left upper member 42 and right upper member 44, only one step 50 or more than two steps 50 can extend between the left upper member 42 and right upper member 44. For instance, should a longer access system 36 be necessary for a particular machine, a longer left upper member 42 and right upper member 44 can be provided with several steps 50 extending between them. Likewise, should a shorter access system 36 be necessary for a particular machine, a shorter left upper member 42 and right upper member 44 can be provided with only one step 50 extending between them. The steps 50 can be an elongate structure of material, such as metal, able to support the weight of an operator of the machine 20.

In an embodiment, the access system 36 includes a left second or lower member 52 extending from a lower end of the left upper member 42. Similarly, the access system 36 includes a right second or lower member 54 extending from a lower end of the right upper member 44. In an embodiment, the left lower member 52 is an elongate bar of material that includes an elongate channel 53 (FIG. 3) and that is configured to fit within the left upper member 42 such that the left lower member 52 can slidably and translationally move along its long dimension relative to the left upper member 42. In this manner, the left lower member 52 is able to telescope out of an end of the left upper member 42, the end being the lower end of the left upper member 42 when the access system is in an access position. Nylon plates (not shown) on external faces of the left lower member 52 or other devices for reducing friction between the left upper member 42 and left lower member 52 can be included. Moreover, other configurations for configuring the left upper member 42, right upper member 44, left lower member 52, and right lower member 54 to provide for translational movement between the left upper member 42 and left lower member 52 and between the right upper member 44 and right lower member 54 are possible. For example, the left lower member 52 need not extend into the end of the left upper member 42, but can be slidably connected to the left upper member 42, such as by a channel welded to a side of the left upper member 42 that has an inner shape corresponding to the outer shape of the left upper member 42, so that the left lower member 52 is able to slide adjacent to the left upper member 42. The right upper member 44 and right lower member 54 can be similarly otherwise configured. The right lower member 54, in an embodiment, is similarly configured to the left lower member 52.

An extension step 56, such as a step configured similarly to the steps 50, can extend between lower ends of the left lower member 52 and right lower member 54, thereby collectively forming a lower ladder portion. While the drawings show only one extension step 56 extending between the left lower member 52 and right lower member 54, more than one step can extend parallel between the left lower member 52 and right lower member 54, for example, to create an access system 36 with greater length. The left upper member 42, right upper member 44, left lower member 52, right lower member 54, steps 50, and extension step 56 are collectively referred to as a ladder assembly 57 as, when the access system 36 is in an extended access position, the access system 36 functions as a ladder.

As the left lower member 52 and right lower member 54 are connected to the left upper member 42 and right upper member 44, respectively, the extension step 56 is able to move toward and away from the steps 50 as the left lower member 52 and right lower member 54 slide relative to the left upper member 42 and right upper member 44, respectively. In this manner, the length between the top most step 50 and the extension step can be varied and, in particular, made shorter when the access system 36 is not in use.

Figure 5:
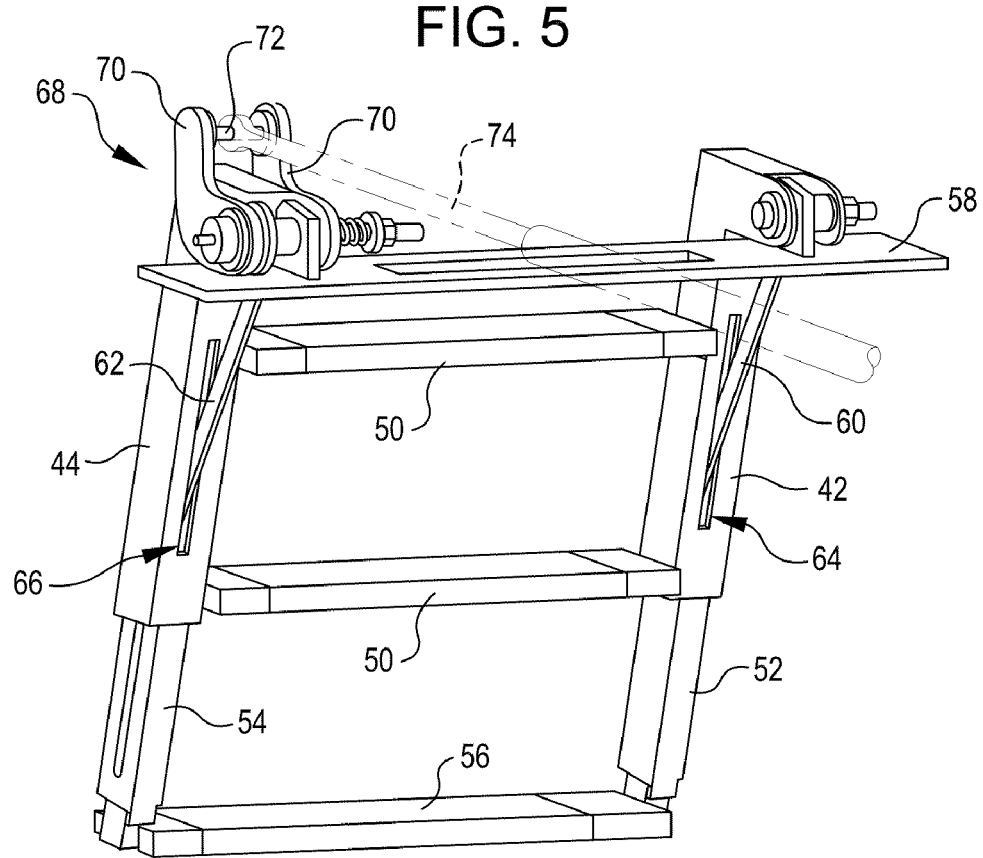
FIG. 5 is a rear perspective view of the access system of FIG. 2.

FIG. 5 shows the access system 36 from a rear vantage point with the ladder assembly 57 in an access position. In an embodiment, the left hinge 46 and right hinge 48 are attached to the upper surface of a horizontally-extending plate 58 of the machine 20, which is attached to an interior portion of the bumper 32 so that each hinge is exposed by a respective recess 40. The left hinge 46 and right hinge 48 can alternatively be attached directly to the bumper 32 or other part of the machine 20 as desired or as warranted by design of the machine 20.

As shown in the drawing, the access system 36 includes a left link 60 extending between the machine 20, such as at a location of the plate 58 below the left hinge 46, and an upper end of the left lower member 52, thereby providing a link between the upper end of the left lower member 52 and the plate 58. In an embodiment, the left link 60 is rotatably connected to the plate 58 at one end and rotatably connected to the left lower member 52 at an opposite end. Generally, the left link 60 can connect directly to the machine 20, such as by connecting to connector (also referred to as a link connector) attached to a portion of a frame of the machine 20, or the left link 60 can connect to the machine 20 indirectly, such as by connecting to a connector located on the plate 58, as shown in the drawings, or by connecting to another suitable portion of the access system 36. In an embodiment, the left link 60 is an elongate strip of metal or other rigid material, although it can also be a ribbon of flexible or other material. In an embodiment wherein the left lower member 52 extends into an end of the left upper member 42, the left upper member 42 includes a left slot 64, which is a slot extending through a portion of a surface of the length of the left upper member 42, so as to allow the left link 60 to pass through the left upper member 42 to the left lower member 52. A right link 62 is configured similarly to the left link 60, extending from the right hinge 48, through a right slot 66 extending along a portion of the length of the backside of the right upper member 44, to an upper end of the right lower member 54.

In an embodiment, one of the upper members, such as right upper member 44, includes a lever assembly 68 mechanically engaging the right upper member 44 at an upper end of the right upper member 44 in front of the right hinge 48. The lever assembly 68 is any device, such as a lever rigidly attached to the left upper member 44, that causes the access system 36 to rotate about the left hinge 46 and right hinge 48 when force is applied to the lever assembly 68. As shown in the drawing, in an embodiment, the lever assembly 68 comprises two parallel lever plates 70, each cut so as to form an "L" shape with a leg of the "L" extending upwardly when the access system 36 is in an access position, as shown in FIG. 5. The lever plates 70 extend parallel to one another on opposite sides of the upper end of the right upper member 44 and mechanically engage the right upper member 44, such as with tabs (not shown) extending beneath or into the sides of the right upper member 44. In an alternate embodiment, the lever assembly 68 and right upper member 44 or left upper member 42 form a unitary component of the access system 36. A lever bar 72, which can be an elongate bar of metal, extends between the lever plates 70 above the upper end of the right upper member 44.

In an embodiment, an actuator 74 engages the lever bar 72 and extends from the lever bar 72 toward an interior of the machine 20, where it is rigidly attached to an appropriate structure of the machine 20, such as an internal frame component of the machine 20, as shown more clearly in FIG. 4. In an embodiment, the actuator 74 is an electric linear actuator, although it can also be a linear hydraulic cylinder assembly or another type of actuator. Generally, the actuator 74 is any device capable of applying a force to an appropriate component of the access system 36 so as to rotate the left upper member 42 about the left hinge 46 and the right upper member 44 about the right hinge 48. The actuator 74 need not apply a linear force, but can also utilize rotational or other force according to a particular embodiment. In addition, the actuator 74 can also include a torque limiter or other mechanism for ensuring that the actuator 74 does not apply more force than desired.

Figure 6:
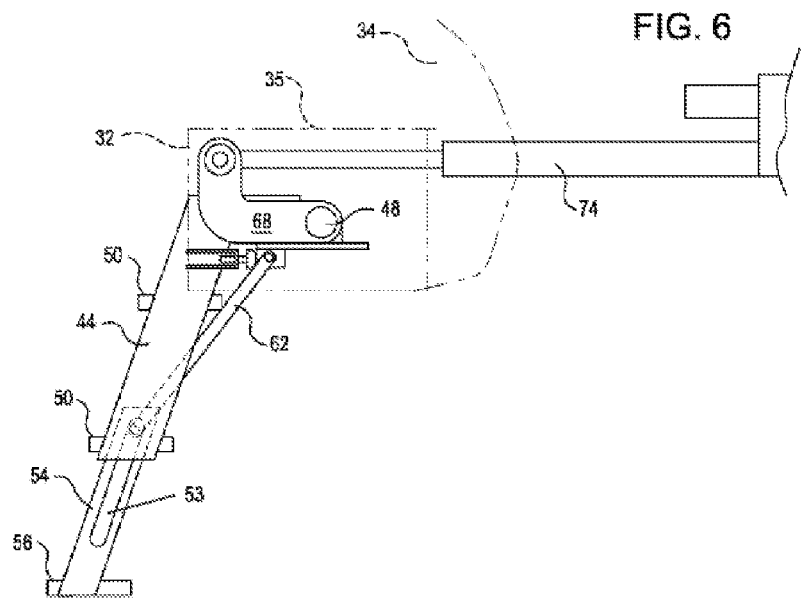
FIG. 6 is side view of the access system of FIG. 2, with the access system in an extended position.
Figure 9:
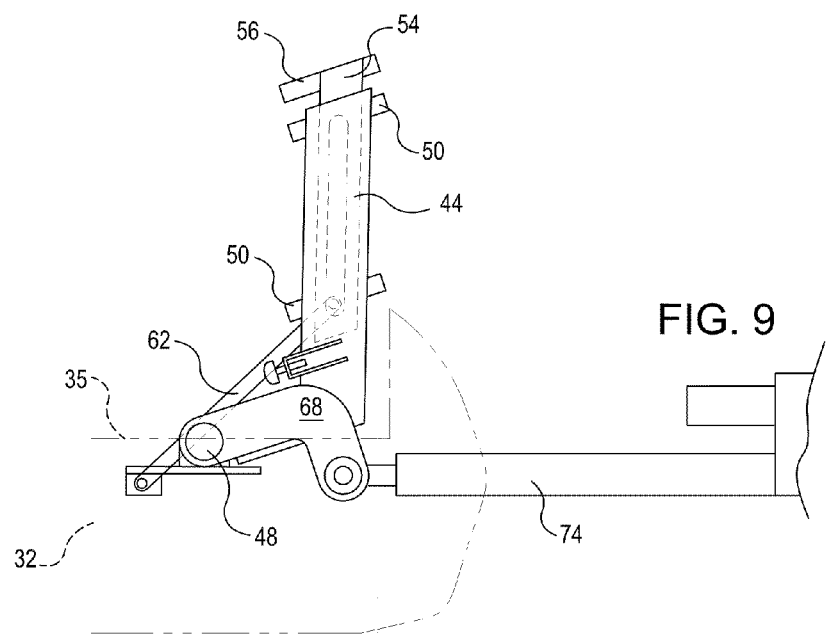
FIG. 9 shows a side view of the access system of FIG. 8, with the ladder in the stowage position.

FIGS. 6 through 9 demonstrate how, in accordance with an embodiment, the access system 36 is moved from an access configuration (also referred to as an access position or extended position), as shown in FIG. 6, to a stowage configuration (or stowage position), as shown in FIG. 9.

Referring specifically to FIG. 6, in the access position, the ladder assembly 57 is oriented with the left lower member 52 and right lower member 54 extending downwardly from the left upper member 42 and right upper member 44, respectively. In an embodiment, the ladder assembly 57 extends downward and slightly away from the machine 20, when in the access position. The extension step 56 is spaced from the lowermost step 50 enough to allow an operator to place his or her foot atop the extension step 56, but close enough so that the operator can step from the extension step 56 to the lowermost step 50. The end of the link 62 is further configured to slide within the elongate channel 53.

Figure 7:
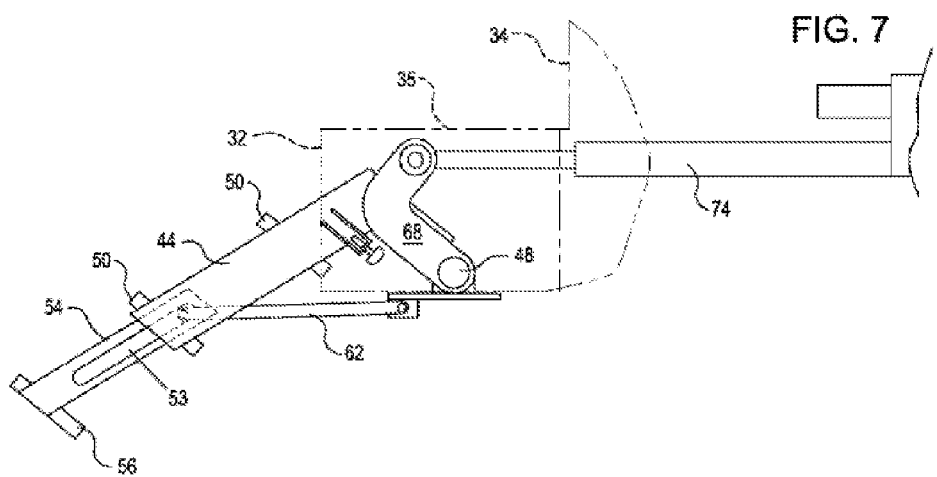
FIG. 7 is a side view of the access system of FIG. 6, having a ladder portion rotated slightly towards a stowage position.
Figure 8:
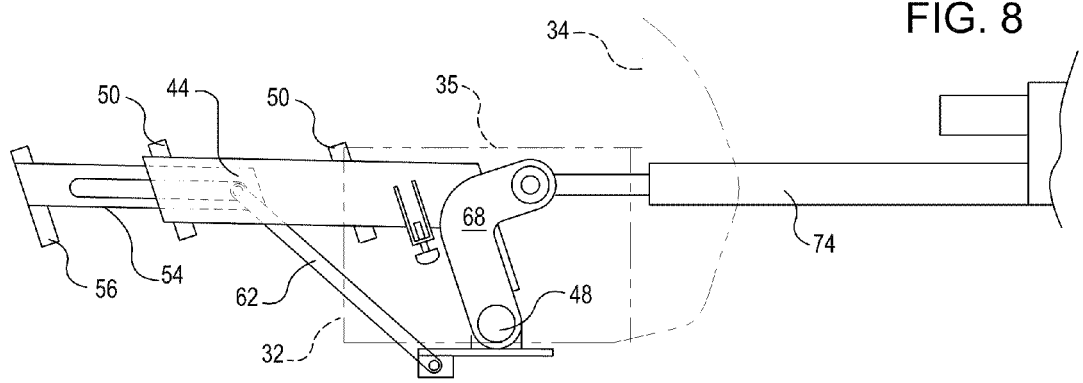
FIG. 8 is a side view of the access system of FIG. 7, shown with the ladder rotated further towards the stowage position.

As shown by comparing FIGS. 6 and 7, when the actuator 74 contracts, for example after actuation of an electric switch (not shown) by the operator, the actuator 74 pulls the lever assembly 68 towards the machine 20, thereby causing the ladder assembly 57 to rotate upwardly about the left hinge 46 and right hinge 48. As the ladder assembly 57 rotates upwardly, the distance between the lower end of the right upper member 44 and the connection of the right link 62 to the machine 20 increases. Consequently, the right link 62 pulls the right lower member 54 further into the right upper member 44, thereby causing the extension step 56 to approach the steps 50. As shown by further comparing FIG. 8, as the actuator 74 contracts further, the left lower member 52 and right lower member 54 extend further into the left upper member 42 and right upper member 44, respectively, bringing the extension step 56 closer to the step 50 closest to the extension step 56.

As shown in FIG. 9, when the actuator 74 has fully contracted, the ladder assembly 57 has rotated approximately 180 degrees from the access position to the stowage position, wherein the ladder assembly 57 extends upwardly from the ledge 35, with the ladder assembly 57 oriented with the left lower member 52 and right lower member 54 extending upwardly from the left upper member 42 and right upper member 44, respectively. In addition, by moving the access system 36 completely to the stowage position, the left link 60 and right link 62 have pulled the left lower member 52 and right lower member 54 nearly completely into the left upper member 42 and right upper member 54, respectively, so that the extension step 56 is adjacent the closest step 50, which is the uppermost step 50 shown in FIG. 9. Consequently, in the stowage configuration, the access system 36 is more compact than in the access configuration. In addition, the access system 36, in the stowage configuration, does not have any components extending laterally from the machine 20 or below the machine 20, thereby reducing any likelihood that the access system 36 may come in contact with the ground or another object or person when the machine 20 is in motion. If a machine contains moving parts, such as a hydraulically-operated boom or rotating cab, moving the access system 36 to the stowage position can also provide for free movement of any moving parts whereas the access system 36 may interfere with movement when in the access position.

Operation of the access system 36 from the stowage configuration to the access configuration is achieved similar to operation of the access system 36 from the access configuration to the stowage configuration, with the process proceeding in reverse. In particular, upon activation of a switch or other device, the actuator 74 pushes the lever bar 72, causing the ladder assembly 57 to rotate downward about the left hinge 46 and right hinge 48. In an embodiment, while the ladder assembly 57 rotates downward, the left link 60 and right link 62 push the left lower member 52 and right lower member 54, respectively, out of the lower end of the left upper member 42 and right upper member 44, respectively, as the distance between the lower ends of the left upper member 42 and right upper member 44 and the connections of the left link 60 and right link 62 to the plate 58 decreases. In an alternate embodiment, the left link 60 and right link 62 are flexible and, consequently, gravity and/or another external force, such as the force of an operator stepping on the extension step 56, push the left lower member 52 and right lower member 54 out of the lower ends of the left upper member 42 and right upper member 44, respectively, thereby separating the steps 50 from the extension step 56. In yet another embodiment, the access system 36 includes only one of the left link 60 and right link 62, which pushes the corresponding left lower member 52 or right lower member 54 out of the end of the corresponding left upper member 42 or right upper member 44.

Referring back to FIG. 4, the access system 36 can include features additional to those listed above. For example, in accordance with an embodiment, the access system 36 can include an emergency release including an emergency release cable 76 and a handle 78. The emergency release cable 76 releases the ladder assembly 57 from the actuator 74 so that the ladder assembly can be manually placed to the access position should the actuator 74 fail or lack a power source. The handle 78 provides an operator of the machine 20 a mechanism for pulling the emergency release cable 76, and can be included at a terminal end of the emergency release cable 76 away from ladder assembly 57 and can be mounted on the machine 20 in a convenient location, such as on a portion of the machine 20 that does not frequently move relative to the remainder of the machine 20, for example, on an external body panel of the machine 20 behind a door of the machine 20. In an embodiment, the handle 78 pulls the emergency release cable 76, which releases a mechanical connection between the ladder assembly 57 and the actuator 74, for example, by pulling one or more components of the lever assembly 68 away from the right upper member 44 so as to mechanically disconnect the lever assembly 68 from the right upper member 44 or from the actuator 74. Generally, any mechanism for allowing manual movement of the ladder assembly 57 can be used in connection with the emergency release cable 76 or with another mechanism controlling whether the access system 36 is operated manually or by the actuator 74.

INDUSTRIAL APPLICABILITY

When using a machine, an operator must typically ascend to a cab containing controls for operating the machine. For example, an operator of the machine 20 must ascend to the cab 28 of the machine 20 in order to drive the machine 20 around a job site where the machine 20 is being used to haul material in the bed portion 24 from one point to another.

To ascend to the cab 28, the operator climbs the ladder portion 57 as if it were a conventional ladder. In particular, the operator begins by stepping onto the extension step 56 and then systematically ascending successive steps 50 until reaching the ledge 35. The operator can grip portions of the ladder assembly 57 and the handrails 38, as necessary, to pull himself or herself up. In the embodiment shown in the drawings, as seen in FIG. 1, the operator can climb additional fender steps 80 extending upwardly from in front of the fender 30, or otherwise suitably located, and ascending the front portion of the fender 30 to access an entrance of the cab 28 or other location on the cab portion 22 of the machine 20. Other ladders, access systems, or mechanisms can be utilized in connection with the access system 36 in order to ascend a machine.

Upon ascending the machine 20, the operator, in an embodiment, activates an activation switch (not shown) electrically connected to the actuator 74, causing the actuator 74 to rotate the ladder assembly 57 upward to the stowage position. A safety switch (not shown) and/or alarm may be included for preventing the machine 20 from achieving full operation until the access system 36 is in the stowage configuration or for alerting the operator that the access system 36 is in the extended access configuration while the machine 20 is in use. With the access system 36 in the stowage configuration, the operator operates the machine 20 until work is complete or until the operator otherwise needs to descend from the cab 28. In order to descend from the cab 28, the operator activates the activation switch, causing the actuator 74 to rotate the ladder assembly 57 downward until the ladder assembly 57 is in the access configuration. The operator then descends the ladder assembly 57 by systematically stepping on successive steps 50 until reaching the extension step 56 from which he or she makes a small step or jump to the ground.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. An access ladder, the access ladder configurable from an extended position for providing access to a structure and a stowed position, the ladder comprising:
    an elongated first member having a first end and a second end and connected to the structure;
    at least one first step extending laterally from the first member;
    an elongated second member associated with the first member and configured for translational movement relative to the first member, the second member having at least one second step extending laterally from the second member, wherein the first member is hollow at the second end and wherein the second member is configured to extend from within the second end; and
    a link pivotally and slidably engaging an elongate channel formed in the elongate second member, the link extending between the second member and the structure through a slot formed in and extending through a surface of the first member, such that rotation of the first member from the extended position to the stowed position moves the second member translationally relative to the first member, thereby moving said at least one second step towards said at least one first step.

2. The access ladder of claim 1, wherein the link is connected to the structure at a link connector and to the first member at the second end, the first member is connected to the structure at the first end, and the link and first member are configured such that rotation of the first member from the extended position to the stowed position increases the distance between the second end and the link connector.

3. The access ladder of claim 1, including an actuator for rotating the member between the extended position and the stowed position.

4. The access ladder of claim 3, wherein the actuator provides a linear force and wherein the access ladder further includes a lever attached to the first member, the lever configured to transmit the linear force into rotational movement of the first member.

5. The access ladder of claim 3, including a release for mechanically disconnecting the first member from the actuator.

6. An access system, the access system configurable between an access configuration for providing access to a structure and a stowed configuration, the access system comprising:
a first ladder portion having an elongated first member from which at least one first step extends horizontally, the first ladder portion having a first end and a second end, the first end attached to the structure;
a second ladder portion having an elongated second member from which at least one second step extends horizontally, the second ladder portion slidably associated to the first ladder portion so as to extend past the second end, wherein the first member is hollow at the second end and the second member is configured to extend from within the second end; and
a link pivotally and slidably engaging an elongate channel formed in the elongate second member, the link extending from the structure to the second ladder portion through a slot extending through a surface of the first member so as to move the second ladder portion to slide relative to the first ladder portion when the first member rotates from an extended position to a stowed position relative to the structure.

7. The access system of claim 6, wherein the link is connected to the structure at a link connector, and the link and first member are configured such that rotation of the first member from the access configuration to the stowed configuration increases the distance between the second end and the link connector.

8. The access system of claim 6:
wherein the first ladder portion further includes an additional first member attached to the structure at an additional first end, the additional first member extending parallel to the first member such that the first step extends between the first member and the additional first member; and
wherein the second ladder portion further includes an additional second member slidably associated with the additional first member and configured such that the second step extends between the second member and the additional second member.

9. The access system of claim 6, including an actuator for rotating the access system between the access configuration and the stowed configuration.

10. The access system of claim 9, wherein the actuator provides a linear force and wherein the access system further includes a lever attached to the first member, the lever configured to transmit the linear force into rotational movement of the first member.

11. The access system of claim 9, including a release for mechanically disconnecting the first member from the actuator.

12. An off-highway vehicle, comprising:
an access system configurable between an access configuration for providing access to a structure and a stowed configuration, the access system comprising:
a first ladder portion having an elongated first member from which at least one first step extends horizontally, the first ladder portion having a first end and a second end, the first end attached to the structure;
a second ladder portion having an elongated second member from which at least one second step extends horizontally, the second ladder portion slidably associated to the first ladder portion so as to extend past the second end; and
a link pivotally and slidably engaging an elongate channel formed in the first member, the link extending from the structure to the second ladder portion through a slot extending through a surface of the first member so as to move the second ladder portion to slide relative to the first ladder portion.

13. The access system of claim 12, wherein the link is connected to the structure at a link connector, and the link and first member are configured together such that rotation of the first member from the access configuration to the stowed configuration increases the distance between the second end and the link connector.

14. The off-highway vehicle of claim 12:
wherein the second ladder portion further includes an additional first member attached to the structure at an additional first end, the additional first member extending parallel to the first member such that the first step extends between the first member and the additional first member; and
wherein the second ladder portion further includes an additional second member slidably associated with the additional first member and configured such that the second step extends between the second member and the additional second member.

15. The access system of claim 14, wherein the additional first member has an additional second end corresponding to the second end of the first member, wherein the second end and additional end are hollow, and wherein the second member and additional second member are configured to extend from within the second end and additional second end, respectively.

16. The access system of claim 15, further including an additional link extending between the structure and the additional second member and wherein each of the link and additional link extends through a slot extending through a surface of a corresponding first member.

* * * * *